United States Patent
Profé et al.

[11] Patent Number: 5,569,865
[45] Date of Patent: Oct. 29, 1996

[54] GAS FLOW THROUGH INJECTOR JET

[75] Inventors: Hans Jürgen Profé, Bobingen; Norbert Rabe, Berlin, both of Germany

[73] Assignee: Hoechst Aktiengesellschaft, Germany

[21] Appl. No.: 291,100

[22] Filed: Aug. 16, 1994

[30] Foreign Application Priority Data

Aug. 18, 1993 [DE] Germany .................. 43 27 693.8

[51] Int. Cl.$^6$ ........................................ G01F 1/37
[52] U.S. Cl. .................. 73/861.52; 28/248; 28/271
[58] Field of Search ............... 73/118.2, 119 A, 73/861.52, 861.39; 28/248, 271, 276

[56] References Cited

U.S. PATENT DOCUMENTS

| | | | |
|---|---|---|---|
| 4,027,536 | 6/1977 | Heggie | 73/119 A |
| 4,134,191 | 1/1979 | Kim et al. | 28/248 |
| 4,174,637 | 11/1979 | Mulzet et al. | 73/119 A |
| 4,461,169 | 7/1984 | Augustin | 73/119 A |
| 4,693,071 | 9/1987 | Morrison | 28/271 |
| 4,986,117 | 1/1991 | Yashizu et al. | 73/119 A |
| 5,020,199 | 6/1991 | Gorrafa | 28/273 |
| 5,326,009 | 7/1994 | Kobayashi et al. | 28/271 |

FOREIGN PATENT DOCUMENTS

| | | |
|---|---|---|
| 0071246 | 2/1983 | European Pat. Off. . |
| 1 926 112 | 11/1969 | Germany . |
| 1 926 22 | 1/1970 | Germany . |
| 15 28 903 | 11/1970 | Germany . |
| WO82/01728 | 5/1982 | WIPO . |

Primary Examiner—Richard Chilcot
Assistant Examiner—Jewel V. Artis
Attorney, Agent, or Firm—Connolly & Hutz

[57] ABSTRACT

A method for monitoring the gas flow rate through injector jets comprises determining the pressure in a drawing tube downstream of the injector jet. The injector jet comprises a feed funnel extended by an injector tube opening into a gas distributor chamber having a gas feed line. The chamber is connected by a curved surface of revolution to an outlet duct. A drawing tube is downstream of the outlet duct, and both the outlet duct and the drawing tube have longitudinal axes that coincide with one another. The downstream end of the injector tube is situated at the junction of the outlet duct with the curved surface of revolution. The drawing tube has a pressure measuring device.

11 Claims, 1 Drawing Sheet

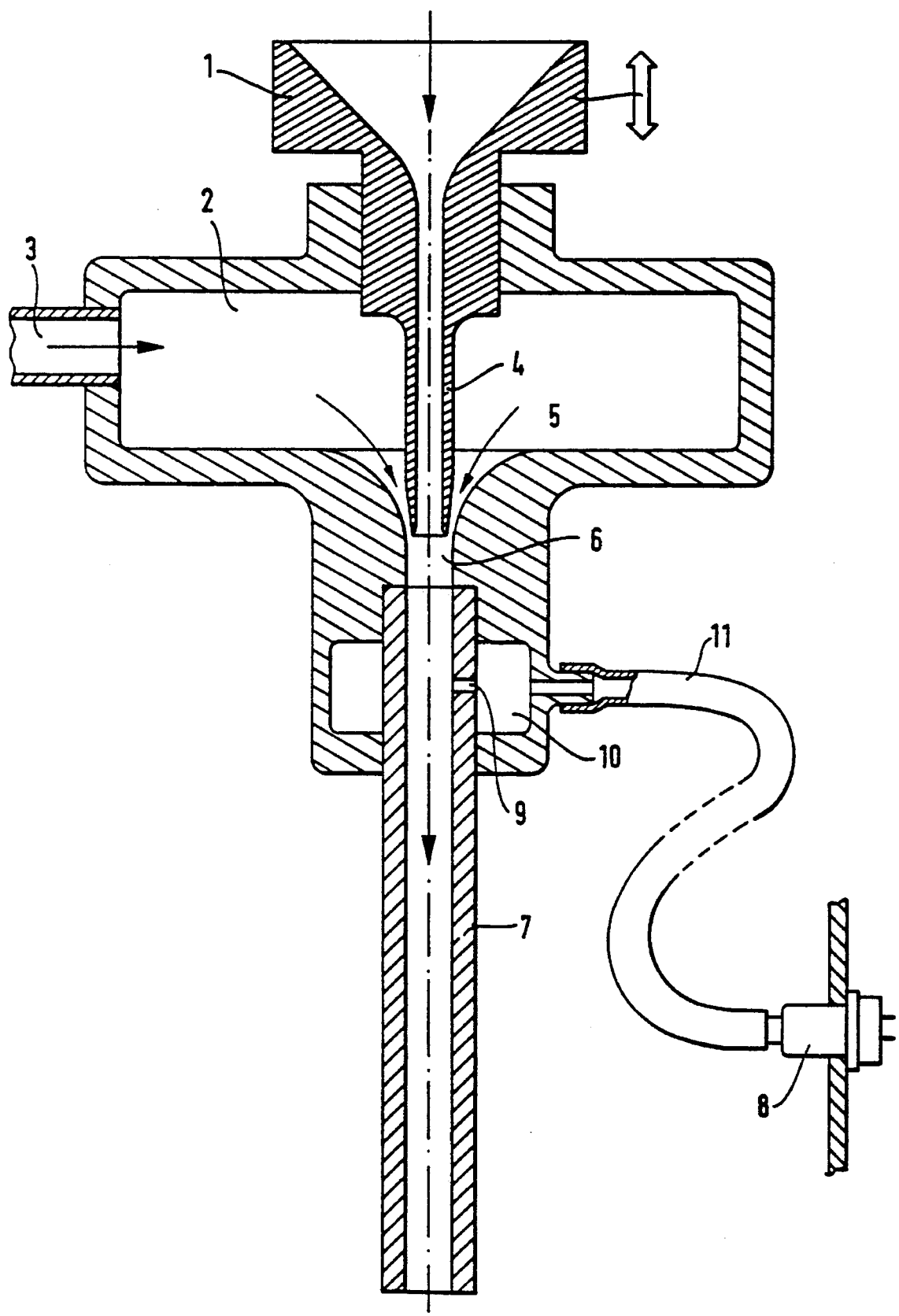

GAS FLOW THROUGH INJECTOR JET

DESCRIPTION

The present invention relates to a method for monitoring the gas flow rate through injector jets, specially designed injector jets and injector jet arrangements, and to the use of such jet arrangements in the process for manufacturing spunbonded webs.

Many process steps in the manufacture, finishing and further processing of fibers employ jets, be it as a conveying means or to achieve particular effects, for example crimping.

In some of these applications it is necessary to check the gas flow rate through the jet. Thus it is general usage, in the manufacture of spunbonded webs, to effect the drawing of the freshly spun filaments by means of drawing jets. These jets are interposed between spinnerets and laydown device (cf. "Vliesstoffe" [nonwovens]; editors: J. Lünenschloβ and W. Albrecht, pp. 106–7, G. Thieme Verlag, 1982). Usually, these drawing jets are designed as injector jets, in which a propellant, normally air, is fed laterally to the jet and flows through the jet in such a way that a negative pressure is produced at its inlet end, so that, together with the filaments, further gas is drawn in which, as intake gas, leaves the jet on the outlet side, together with the propellant and filaments.

In order to enable drawing under as closely controlled conditions as possible, it is plausible to monitor the gas flow rate during drawing. This can be achieved, for example, by rotameters which are installed in the respective feed lines for the propellant to the drawing jets. With the rotameter measurement, a plummet (float) in a gas flow encounters a buoyancy force and a dynamic force. The level of the plummet constitutes a numerical measure for the flow rate.

The installation of rotameters requires a certain amount of space. Moreover, this measuring method only permits monitoring of the propellant supply, whereas the intake gas supply cannot be checked or can be checked only under more difficult conditions.

We have now found that the gas flow rate of injector jets can be checked and automated in a simple and space-saving manner if, as a measure for the flow rate of intake gas and propellant, the pressure in the drawing tube is measured.

The present invention relates to a method for monitoring the gas flow rate of injector jets which comprises determining the pressure in the drawing tube downstream of the injector jet.

The measurement of the pressure in the drawing tube downstream of the injector jet can be effected by means of a pressure sensor.

The pressure sensor may be any device suitable for this purpose, as long as it does not impede the transport of the filaments in the drawing tube.

The pressure sensor is used to determine the dynamic pressure of the gas in the drawing tube.

As the gas passes through the drawing tube, the dynamic pressure decreases linearly, in the direction toward the outlet side, down to ambient pressure. The larger the dynamic pressure, the more accurately can the gas flow rate be determined. Preferably, the dynamic pressure is therefore measured in that third of the drawing tube which adjoins the entry point of the gas into the drawing tube.

Examples of pressure sensors include dial manometers.

The measuring heads of said pressure sensors can open directly into the drawing tube and thus determine the dynamic pressure directly.

In a particularly preferred embodiment, the static pressure caused by the dynamic pressure in the drawing tube is measured at the point in question of the drawing tube. To this end, the drawing tube at the point in question contains a bore which opens into an enclosed space in which a static pressure builds up which corresponds to the pressure at the point in question of the drawing tube. The pressure measurement is performed in said measuring cavity, for example by a pressure sensor whose measuring head is disposed in the wall of the measuring cavity or which is connected to the measuring cavity, preferably via a flexible tube connection. In selecting the diameter of the bore, care should be taken for pressure fluctuations in the drawing tube to be equalized and not to be transmitted, or transmitted only in attenuated form, into the measuring cavity. Typical diameters of the bore are in the range of less than or equal to 1.2 mm.

Particular preference is given to the embodiment in which the pressure sensor is connected to the measuring cavity via a flexible tube connection. This version permits the connection of a plurality of measuring points to one pressure sensor.

In a preferred embodiment of the method according to the invention, the measured pressures of a plurality of injector jets are polled sequentially.

This is normally effected by a selector switch, by means of which the pressure measurement devices of the individual injector jets are polled sequentially.

The selector switch may be any device suitable for this purpose, for example an electronic circuit which polls the individual pressure measuring devices sequentially, said polling optionally being automated or being carried out manually; alternatively, it may be a mechanical control element, for example a step switch.

Preferably, the selector switch is a pneumatic step switch. A relevant example is a pneumatic step switch supplied by Samsomatic. In this embodiment, the flexible pipes leading away from a plurality of measuring cavities can be run to a pressure sensor via the selector switch.

In a further particularly preferred embodiment, the flexible tubes leading away from the individual measuring cavities are switched via an automatically controlled magnetic-valve system and passed to a pressure sensor.

In a particularly preferred embodiment of the method according to the invention, the measured pressure of various injector jets is successively fed to a transducer and displayed and/or the transformed measured pressure is used to regulate the gas flow rate through the injector jet in question. To this end, the measured gas flow rate of the individual jets is compared with a predetermined setpoint and, when it exceeds or falls below a given range, is controlled in such a way that the gas flow rate is moved back into said range.

The invention further relates to an injector jet comprising a feed funnel (1) which is extended by an injector tube (4) and which opens into a gas distributor chamber (2) which is at least equipped with a gas feed line (3) and which is connected, by a curved surface of revolution (5), to an outlet duct (6) adjoining which there is a drawing tube (7), the longitudinal axis of the injector tube (4) coinciding with the longitudinal axis of the outlet duct (6), and the downstream end of the injector tube (4) being situated at the level of the junction of the outlet duct (6) with the curved surface of revolution (5), wherein the drawing tube (7) has a pressure measuring device (8).

Injector jets of this type are disclosed, for example, DE-A-1,926,112.

In a preferred refinement of the injector jet according to the invention, the injector tube (4) is designed so as to be movable in the direction of its longitudinal axis, so that the annular gap delimited by the injector tube (4) and the curved surface of revolution (5) can be varied. By means of this refinement, the streams of propellant and drawn-in gas can be controlled.

Examples of such injector jets are found in U.S. Pat. No. 4,346,504.

In a particularly preferred refinement of the injector jet according to the invention, there is disposed, in the drawing tube (7), a bore (9) which opens into an enclosed measuring cavity (10) in which the pressure measurement is effected by means of a pressure measuring device (8), for example a pressure sensor, which is preferably connected to the enclosed measuring cavity (10) via a flexible tube (11).

The invention further relates to an injector jet arrangement comprising a plurality of injector jets as defined above, and a selector switch, preferably a pneumatic step switch, by means of which arrangement the pressure sensors of the individual injector jets are polled sequentially.

Especial preference is given to an injector jet arrangement as defined above, in which a single transducer is provided which is driven by the selector switch.

Said transducer, in particular, has a display device which displays the pressures measured. Preferably, one display device is provided per injector jet.

In an especially preferred embodiment, the invention relates to an injector jet arrangement as defined above, wherein a regulating device and appliances for setting the gas flow rate through the injector jets are provided, which regulating device is driven by the transducer, compares the measured gas flow rate through the individual injector jets with a predetermined setpoint and, when said flow rate exceeds or falls below a given range, controls it in such a way, by means of the appliances, that the gas flow rate is moved back into said range. This can be achieved, for example, by controlling the pressure of the propellant and/or by the above-described movement of the injector tube (4) in the direction of its longitudinal axis.

The injector jet arrangement described can be used, in particular, for measuring the gas flow rate of the drawing jets in the manufacture of spunbonded webs. The invention also relates to the use for this purpose.

The FIGURE shows, by way of example, an injector jet according to the invention.

The injector jet according to the invention has a feed funnel (1) for the filament bundle, which funnel is extended by an injector tube (4) and opens into a gas distributor chamber (2) which is at least equipped with a gas feed line (3). The gas distributor chamber (2) is connected, by a curved surface of revolution (5), to an outlet duct (6) adjoining which there is a drawing tube (7) which is joined to the outlet duct (6) in a gas-tight manner. The longitudinal axis of the injector tube (4) coincides with the longitudinal axis of the outlet duct (6), and the downstream end of the injector tube (4) is situated at the level of the junction of the outlet duct (6) with the curved surface of revolution (5). As a result, a gap is formed through which the propellant supplied by the gas supply line (3) can escape into the outlet duct (6). The drawing tube (7) has a pressure measuring device (8).

In the embodiment shown, there is disposed in the drawing tube (7) a bore (9) which opens into an enclosed measuring cavity (10). In said measuring cavity (10), the static pressure is measured by means of a pressure measuring device (8), preferably a pressure sensor, which is connected to the measuring cavity (10) via a flexible tube (11).

The measured value determined by the pressure sensor is passed, via a pneumatic step switch (not shown), to a transducer (not shown) which drives a display device (not shown).

We claim:

1. A method for monitoring the gas flow rate through an injector jet which comprises determining the pressure in a drawing tube downstream of the injector jet.

2. The method as claimed in claim 1, wherein the static pressure caused by dynamic pressure in the drawing tube is measured in an enclosed measuring cavity which communicates with the drawing tube via a bore.

3. The method as claimed in claim 2, wherein the pressure measurement is effected by a pressure sensor connected to the enclosed measuring cavity via a flexible tube.

4. The method as claimed in claim 1, wherein the measured pressures of a plurality of injector jets are polled sequentially.

5. The method as claimed in claim 4, wherein static pressure caused by dynamic pressure in the drawing tube is measured in an enclosed measuring cavity which communicates with the drawing tube via a bore and the pressure measurement is effected by a pressure sensor connected to an enclosed measuring cavity via a flexible tube, the polling of the measured pressures of a plurality of injector jets being effected by a pneumatic step switch.

6. The method as claimed in claim 4, wherein static pressure caused by dynamic pressure in the drawing tube is measured in an enclosed measuring cavity which communicates with the drawing tube via a bore and the pressure measurement is effected by a pressure sensor connected to an enclosed measuring cavity via a flexible tube, the polling of the measured pressures of a plurality of injector jets being effected via an automatically controlled magnetic-valve system.

7. The method as claimed in claim 4, wherein the measured pressure is successively fed to a single transducer and is displayed.

8. The method as claimed in claim 4, wherein the measured gas flow rate of the individual jets is compared with a predetermined setpoint and, when it exceeds or falls below a given range, is controlled in such a way that the gas flow rate is moved back into said range.

9. An injector jet for drawing and transporting filaments comprising a feed funnel extended by an injector tube opening into a gas distributor chamber, the gas distribution chamber having a gas feed line and being connected by a curved surface of revolution to an outlet duct, a drawing tube downstream from the outlet duct, both the injector tube and the outlet duct each having a longitudinal axis coinciding with one another, and the downstream end of the injector tube being situated at a junction of the outlet duct with the curved surface of revolution, and a pressure measuring device connected to the drawing tube.

10. The injector jet as claimed in claim 9, wherein the injector tube is movably mounted in the direction of its longitudinal axis.

11. The injector jet as claimed in claim 9, wherein the drawing tube has a bore which opens into an enclosed measuring cavity in which pressure measurement is effected by the pressure measuring device.

* * * * *